United States Patent
Strobl

[11] Patent Number: 5,899,572
[45] Date of Patent: May 4, 1999

[54] BEARING ASSEMBLY FOR A MINIATURE MOTOR

[75] Inventor: Georg Strobl, Stuttgart, Germany

[73] Assignee: Johnson Electric S.A., Switzerland

[21] Appl. No.: 08/826,945

[22] Filed: Apr. 8, 1997

[30] Foreign Application Priority Data

Apr. 10, 1996 [GB] United Kingdom .................. 9607453

[51] Int. Cl.$^6$ ........................................... F16C 33/10
[52] U.S. Cl. ..................... 384/279; 384/902; 384/411; 384/213
[58] Field of Search .................. 384/279, 902, 384/411, 213, 214, 192

[56] References Cited

U.S. PATENT DOCUMENTS

| 2,669,491 | 2/1954 | Haller | 384/902 X |
|---|---|---|---|
| 2,728,619 | 12/1955 | Haller . | |
| 3,352,612 | 11/1967 | Eudier | 384/279 |
| 4,594,009 | 6/1986 | Gutris | 384/279 X |

FOREIGN PATENT DOCUMENTS

| 20854 | 1/1981 | European Pat. Off. . | |
|---|---|---|---|
| 2101905 | 7/1971 | France . | |
| 71539 | 3/1993 | Japan | 384/902 |
| 185528 | 7/1994 | Japan | 384/279 |
| 368022 | 8/1988 | Switzerland . | |

*Primary Examiner*—Thomas R. Hannon
*Attorney, Agent, or Firm*—Ostrolenk, Faber, Gerb & Soffen, LLP

[57] ABSTRACT

A bearing assembly 10 comprising an oil impregnated sintered bushing 15 supported by a bearing retainer 20 and a sintered oil collector 14 disposed in direct physical contact with an external surface of the bushing 15 to remove excess oil from the bushing. The oil collector 14 is preferably substantially oil free or non-impregnated, has a volume at least 10% that of the bushing and has a porosity which is 5 to 10% greater than the porosity of the bushing.

14 Claims, 2 Drawing Sheets

BEARING ASSEMBLY FOR A MINIATURE MOTOR

FIELD OF THE INVENTION

This invention relates to bearing assemblies and in particular, to bearing assemblies for miniature motors.

PRIOR ART

Bearings for such motors are usually oil impregnated sintered bronze bushings or ball bearings. However, ball bearings are significantly more expensive and thus, bushings are preferred for low cost motors.

One problem with oil impregnated sintered bushings is that the bushing is impregnated with oil by immersing the bushing into a vat of oil and allowing the oil to penetrate the pores of the bearing to eventually fill the minute cavities within the material of the bushing. This process may be accelerated by application of heat and/or a vacuum to the vat. The end result is a bushing filled with oil at room temperature. The minute cavities within the bushing material retain the oil even when the bushing is stored for a long period of time. However, in use, the bushing gets hot and may operate at a temperature of up to 140° C. At this temperature, the oil expands and as the bushing is already saturated with oil, beads of oil form on the surface of the bushing and may migrate to other parts of the motor including the commutator or brushes where it may cause a deterioration in motor performance. Due to the method of impregnating the bushings with oil, it is not possible to reliably and consistently impregnate the bushings with oil to a capacity other than full.

In the past, oil reservoirs formed of felt or similar material have been used to replace oil used by the bushings. Oil reservoirs of sintered material are also known, see for example EP-A-020854, which avoids contamination of the bearing surface by fibres from the felt. However, oil reservoirs are filled with oil to keep the bushing full of oil and as such are not designed, arranged or adapted to remove excess oil from the bearing.

Another prior art arrangement to prevent the migration of excess oil from the bushings involved placing plastic caps on both sides of the bushing which form an oil tight seal with the bearing retainer. However, because the caps have holes for the shaft, the oil still migrated and the cost of supplying and fitting the caps was not insignificant.

AIM OF THE INVENTION

The present invention overcomes the problem of excess oil on a bushing without reducing the volume of oil the bushing contains by providing a sintered oil collector in direct contact with an external surface of the oil impregnated bushing to absorb any excess oil which otherwise may form on an outer surface of the bushing. The collector is substantially free of oil before the collector is brought into contact with the bushing; or is at least non-saturated. By non-saturated, we mean that the oil collector may absorb more oil than it initially holds when the bushing assembly reaches operating temperature. However, ideally the oil collector is substantially oil free before it is brought into contact with the bushing or is assembled in the bushing assembly.

SUMMARY OF THE INVENTION

According to one aspect, the present invention provides a bearing assembly for a miniature electric motor comprising: an oil impregnated sintered bushing and a bearing retainer supporting the bearing characterised in that the assembly further comprises a sintered oil collector for collecting excess oil from the bearing and for replacing oil in the bearing as the oil is consumed during use, the sintered oil collector being supported by the bearing retainer.

Preferably, the oil collector is of a substantially oil-free sintered material.

Preferably, the oil collector is ring shaped and is seated on a radially outer surface of the bearing or contacts an axial end face of the bearing, preferably located about a step formed on the axial end face.

According to a second aspect, the present invention provides a method of collecting excess oil from a sintered bearing saturated with oil as the bearing heats up, comprising the step of placing an oil collector of sintered material in contact with the bearing.

Preferably, the oil collector gives up oil collected from the bearing to replace oil consumed during use by the bearing.

According to another aspect, the present invention provides a method of assembling a bearing assembly, comprising the steps of: providing a sintered oil impregnated bearing; and supporting the bearing by a bearing retainer, characterised by providing a sintered oil collector and placing the oil collector in direct contact with an outer surface of the bearing to collect excess oil from the bearing.

Preferably, the bearing retainer is used to maintain direct contact between the bearing and the oil collector.

Preferably, the bearing is a self-aligning bushing and the oil collector is used to limit radial movement of the bushing and/or to press the bushing into contact with the bearing retainer.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

The preferred bushing assemblies can be divided into two groups, those with plain sleeve bushings (FIGS. 1 to 3) and those with self-aligning bushings (FIGS. 4 to 7). Self-aligning bushings allow the bushing to pivot slightly or nutate in its retainer to compensate for small variations in alignment between the axis of the bushings and the axis of the shaft journalled in the bushings. Standard or plain sleeve bushings do not pivot and are simpler in construction.

The preferred bushing assemblies 10 have an oil collector 14, a bushing 15 and a bearing retainer 20 supporting the bushing. The bearing retainer may be any suitable means for retaining the bushing as commonly used. Shown in the embodiments is a bearing retainer formed by a drawn pocket in the end wall of a deep drawn can-like casing for a miniature motor. For clarity, only a portion of the casing surrounding the bearing retainer is shown in the figures.

Figure 1:
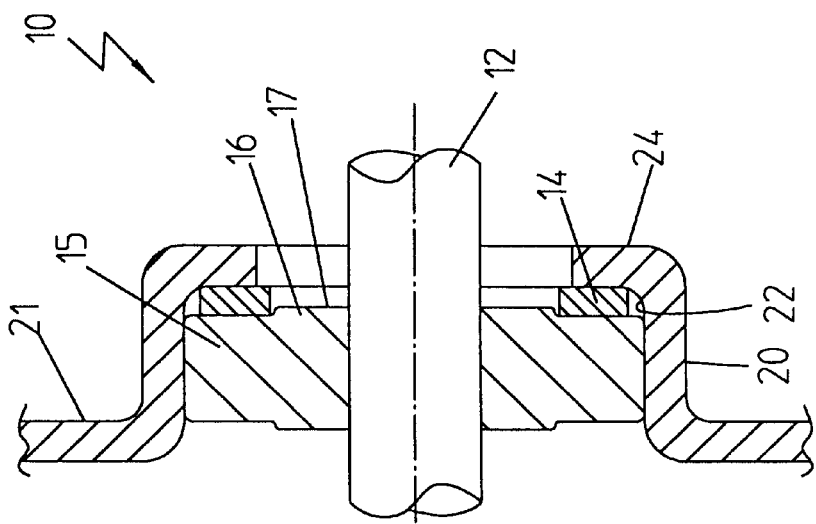
FIGS. 1 to 3 illustrate, in section, bearing assemblies according to preferred embodiments, incorporating sleeve bushings.

FIG. 1 shows a bearing assembly 10 with a standard sleeve bushing 15 fitted to a shaft 12 and press fitted into the drawn pocket 22 of the motor casing 21. The axial end of the pocket has a hole through which the shaft passes. The hole in the pocket forms an annular lip 24 around the axially extending wall 23 of the pocket 22. Sandwiched between the bushing 15 and the annular lip 24 is the oil collector 14. The oil collector is a sintered ring which is held in contact with a surface of the bushing. The oil collector is of sintered bronze, similar to the bushing, although other materials such as sintered iron may be used.

Figure 2:
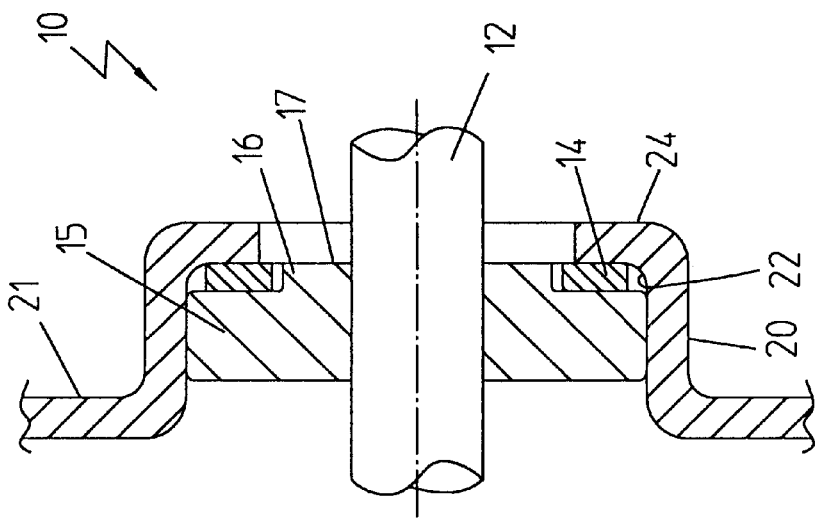

In FIG. 2, the bearing assembly 10 is similar in construction to the embodiment of FIG. 1 except that one of the axial ends 17 of the bushing 15 is formed with a step 16. The sintered ring oil collector 14 is located about the step 16 which assists in assembling the bearing by centering the ring on the axial end 17 of the bushing 15. The ring may be seated on the step or may be loosely located about the step while being held against the end of the bushing by the annular lip 24 of the bearing retainer.

Figure 3:
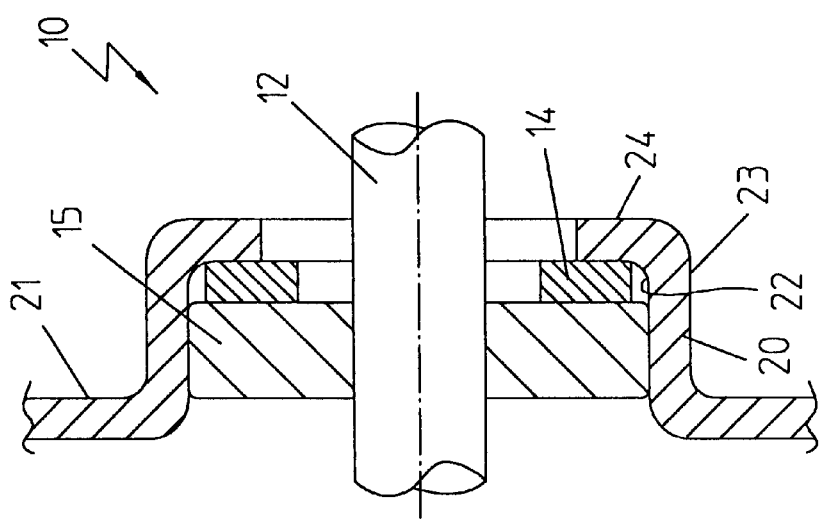

In FIG. 3, the bearing assembly 10 is similar to that shown in FIGS. 1 and 2 except that both axial ends 17 of the bushing 15 are formed with steps 16. The steps of FIG. 3 are smaller than the step of the embodiment of FIG. 2. In this manner, the bushing 15 is symmetrical assisting assembly and the steps 16 are smaller to assist locating the oil collector ring on the axial end 17 of the bushing 15. The oil collector ring 14 is loosely located about the step 16 and held in contact with an outer end face of the bushing by the annular lip 24 of the bearing retainer 20.

In the embodiments of FIGS. 1, 2 and 3, the bushing 15 is a press fit within the pocket 22 of the bearing retainer 20 thus requiring no additional parts to retain the bushing or to retain the oil collector ring in contact with the bushing 15.

Figure 4:
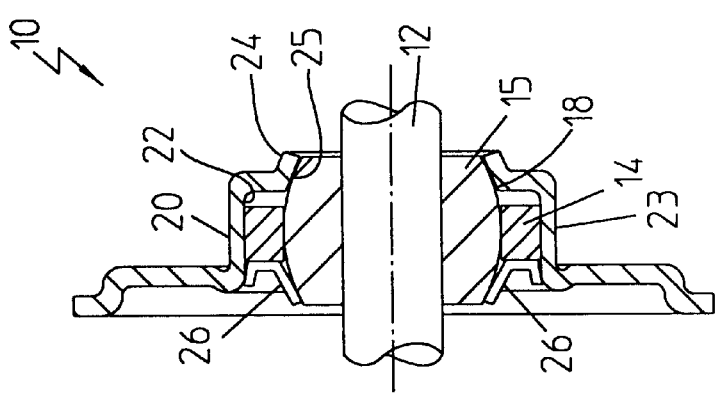

FIG. 4 illustrates a bearing assembly 10 with a self-aligning bushing 15. The bushing 15 is part spherical and mates or abuts a co-operating edge portion 25 formed on the annular lip 24 on the pocket 22 of the bearing retainer 20. The edge portion contacts and supports the bearing against axial and radial movement while allowing the bushing 15 to pivot or nutate. The edge portion 25 may be part spherical or part conical. A retaining spring 26 is used to urge the bushing 15 into contact with the edge portion 25. The retaining spring 26 also provides a little support against radial displacement of the bushing 15. However, in this embodiment, the oil collector 14 is a sintered ring placed in contact with the radial outer surface 18 of the bushing and extends from the bushing to the axial wall 23 of the pocket 22 of the bearing retainer 20 to not only provide the oil collector function but also to positively support the bushing 15 against radial movement such as that which may occur when the motor is subjected to side impact force, such as when dropped, which force may be sufficient to overcome the radial support provided by the retaining spring 26 and edge portion 25 alone.

Figure 5:
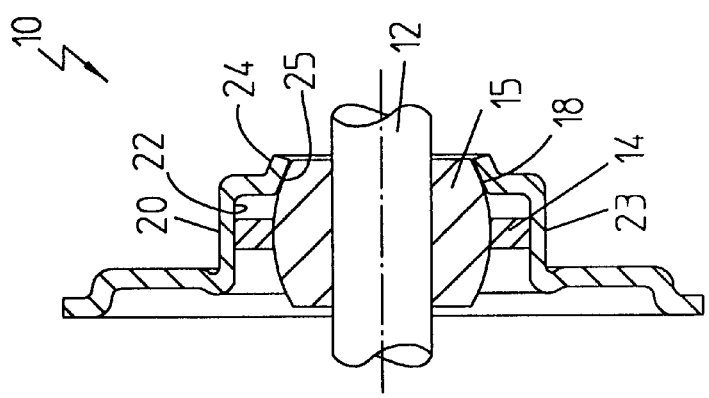

FIG. 5 is a similar embodiment to that of FIG. 4 except that the oil collector ring is narrower, thus accommodating a lesser percentage of the oil from the bushing 15. The retainer spring is omitted for clarity, although any suitable retainer spring may be used.

Figure 6:
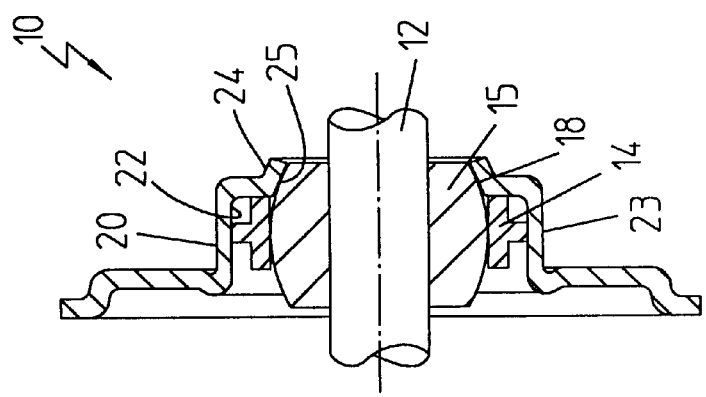

FIG. 6 illustrates a further embodiment similar to that of FIG. 4 except that the oil collector ring 14 has a T-shaped cross-section. The T-shaped cross-section allows the ring 14 to contact both the axially extending wall 23 of the pocket 22 and the annular lip 24 without fouling the corner radius formed between the axial wall and the annular lip. Again, the retainer spring has been omitted for clarity.

Figure 7:
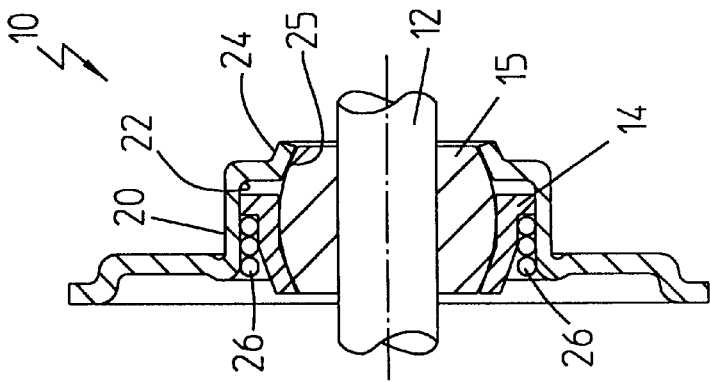
FIGS. 4 to 7 illustrate, in section, bearing assemblies according to additional preferred embodiments, incorporating self-aligning bushings.

FIG. 7 illustrates a further embodiment similar to that of FIG. 4 except that the oil collector ring 14 is shaped similar to provide two contact areas with the bushing 15. Depending on the construction, the retaining spring may bear directly onto the oil collector ring 14 to urge the bushing 15 into contact with the edge portion 25 of the bearing retainer or the oil collector ring 14 may be a press fit inside the pocket 22 of the bearing retainer thereby capturing the bushing 15 between the oil collector 14 and the edge portion 25 without the need for the retaining spring. However, the use of the retaining spring 26 is preferred and in that case, the oil collector ring 14 should be able to move freely axially within the pocket 22 of the bearing retainer.

The use of the oil collector provides a place for the oil from the bushing to go when the bushing heats up during use. By making the oil collector from a porous sintered material such as material similar to the material of the bushing, the porosity of the material will allow the oil to be removed from the bushing without forming beads of excess oil on the surface of the bushing. It is thought that if the volume of the oil collector 14 is at least 10% that of the bushing 15, then a 10% reduction in the oil volume of the bushing 15 may be achieved by diffusing or capillary action of the oil through the bushing and the oil collector. In addition, if the porosity of the oil collector 14 is 5 to 10% greater than the porosity of the bushing 15, as the oil is consumed during use, it will be more rapidly replaced by the oil held by the oil collector. It is thought that one advantage of this method over using a bushing with only 90% oil impregnation is that at low temperatures, e.g., −40° C, the bearing will function better as the oil in the center of the bushing will stay closer to the bearing surface and will be able to form an oil film more quickly at start-up compared to a 90% impregnated bushing on the basis that the bushing will draw back the oil from the oil collector due to a stronger capillary action of the bushing compared to that of the oil collector.

In a standard sintered bearing, the porosity is normally about 20% and therefore, the oil collector should have a porosity of about 25%. While it is envisaged that the oil collector would need a volume of at least 10% of the bushing, oil collectors with a volume of up to 50% or more could be considered for some applications, especially where some lubricating oil is added to the oil collector before assembly.

I claim:

1. A bearing assembly for a miniature electric motor comprising:
   an oil impregnated sintered bearing;
   a bearing retainer supporting the bearing; and
   a sintered oil collector for collecting excess oil from the bearing and for returning the excess oil to the bearing as the oil is consumed during use, wherein the sintered oil collector is in direct contact with an outer surface of the bearing and has an oil retaining capacity of at least 10% of that of the bearing.

2. A bearing assembly as defined in claim 1 wherein the oil collector is of a substantially oil-free sintered material.

3. A bearing assembly according to claim 1 wherein the oil collector is ring shaped and is seated on a radially outer surface of the bearing.

4. A bearing assembly according to claim 1 wherein the bearing is a self aligning bushing and the oil collector is arranged to co-operate with the bearing retainer to limit radial movement of the bushing.

5. A bearing assembly according to claim 1 wherein the oil collector assists the bearing retainer to retain the bearing.

6. A bearing assembly according to claim 1 wherein the oil collector is ring shaped and contacts an axial end face of the bearing.

7. A bearing assembly according to claim 1 wherein the porosity of the oil collector is 5 to 10% greater than the porosity of the bearing.

8. A bearing assembly according to claim 1 wherein the bearing is a self-aligning bearing.

9. A bearing assembly for a miniature motor comprising:

an oil impregnated sintered bearing;

a bearing retainer supporting the bearing; and a sintered oil collector for collecting excess oil from the bearing and for returning the excess oil to the bearing as the oil is consumed during use, wherein the bearing has a step formed on an axial end thereof, and wherein the oil collector is ring shaped and is located about the step in contact with the axial end face of the bearing.

10. A bearing assembly according to claim 9 wherein the volume of the oil collector is at least 10% of the volume of the bearing.

11. A bearing assembly according to claim 9 wherein the oil collector cooperates with the bearing retainer to retain the bearing.

12. A bearing assembly according to claim 11 wherein the oil collector is arranged to limit radial movement of the bushing.

13. A bearing assembly according to claim 9 wherein the porosity of the oil collector is 5 to 10% greater than the porosity of the bearing.

14. A bearing assembly according to claim 9 wherein the oil collector is of a substantially oil-free sintered material.

* * * * *